(12) United States Patent
Zhang et al.

(10) Patent No.: US 7,962,283 B2
(45) Date of Patent: Jun. 14, 2011

(54) DEVIATION-CORRECTION SYSTEM FOR POSITIONING OF MOVING OBJECTS AND MOTION TRACKING METHOD THEREOF

(75) Inventors: Li Zhang, Beijing (CN); Zhiqiang Chen, Beijing (CN); Lijun Wang, Beijing (CN); Zhiming Wang, Beijing (CN); Ziran Zhao, Beijing (CN); Yuxiang Xing, Beijing (CN); Yongshun Xiao, Beijing (CN); Yuanjing Li, Beijing (CN); Yinong Liu, Beijing (CN)

(73) Assignees: Nuctech Company Limited, Beijing (CN); Tsinghua University, Beijing (CN)

( * ) Notice: Subject to any disclaimer, the term of this patent is extended or adjusted under 35 U.S.C. 154(b) by 1208 days.

(21) Appl. No.: 11/644,137

(22) Filed: Dec. 22, 2006

(65) Prior Publication Data
US 2007/0179710 A1    Aug. 2, 2007

(30) Foreign Application Priority Data
Dec. 31, 2005   (CN) .......................... 2005 1 0135929

(51) Int. Cl.
*G01C 21/30* (2006.01)
*G01C 21/32* (2006.01)
(52) U.S. Cl. ...... 701/210; 701/207; 701/208; 340/995.1
(58) Field of Classification Search .................. 701/221, 701/224, 300, 207–210; 342/450, 64; 455/456.1; 348/143, 148; 180/169; 382/254, 260; 340/990, 340/995, 340/995.1
See application file for complete search history.

(56) References Cited

U.S. PATENT DOCUMENTS

| | | | | | |
|---|---|---|---|---|---|
| 4,796,198 | A | * | 1/1989 | Boultinghouse et al. | 701/23 |
| 5,087,916 | A | * | 2/1992 | Metzdorff et al. | 342/64 |
| 5,109,425 | A | * | 4/1992 | Lawton | 382/107 |
| 5,111,401 | A | * | 5/1992 | Everett et al. | 701/24 |
| 5,525,808 | A | * | 6/1996 | Irie et al. | 250/548 |
| 5,564,650 | A | * | 10/1996 | Tucker et al. | 244/3.17 |
| 5,680,313 | A | * | 10/1997 | Whittaker et al. | 701/300 |
| 5,961,571 | A | * | 10/1999 | Gorr et al. | 701/207 |
| 6,199,000 | B1 | * | 3/2001 | Keller et al. | 701/50 |

(Continued)

OTHER PUBLICATIONS

Spatio-temporal landscape analysis in mountainous terrain by means of small format photography: a methodological approach; Aschenwald, J. et al.; Geoscience and Remote Sensing, IEEE Transactions on; vol. 39, Issue 4, Apr. 2001 pp. 885-893; Digital Object Identifier 10.1109/36.917917.*

(Continued)

*Primary Examiner* — Cuong H Nguyen
(74) *Attorney, Agent, or Firm* — Kinney & Lange, P.A.

(57) ABSTRACT

The present invention relates to the deviation-correction system for positioning of moving objects, and discloses a deviation-correction system for positioning of moving objects and the motion-tracking method thereof. The system includes a control system for receiving motion parameters required for deviation-correction, and sending commands to an actuator to control a moving object based on the motion parameters, the deviation-correction system for positioning of moving objects further comprising: a reference object which is set as a specified motion trail for the moving object; an image capturing system for acquiring successive digital image data upon the moving object moves; a motion tracking system for performing a motion tracking algorithm based on the digital image data transmitted by the image capturing system to judge whether the current motion state needs to be corrected and then transmitting the motion parameters required for deviation-correction to the control system.

9 Claims, 2 Drawing Sheets

U.S. PATENT DOCUMENTS

| | | | | |
|---|---|---|---|---|
| 2003/0060936 | A1* | 3/2003 | Yamamura et al. | 701/1 |
| 2005/0131588 | A1* | 6/2005 | Kuge et al. | 701/1 |
| 2005/0131589 | A1* | 6/2005 | Yamamura et al. | 701/1 |
| 2005/0131590 | A1* | 6/2005 | Kuge et al. | 701/1 |
| 2006/0095348 | A1* | 5/2006 | Jones et al. | 705/29 |
| 2006/0095349 | A1* | 5/2006 | Morgan et al. | 705/29 |
| 2006/0217131 | A1* | 9/2006 | Alizadeh-Shabdiz et al. | 455/456.1 |
| 2007/0038374 | A1* | 2/2007 | Belenkii et al. | 701/222 |
| 2008/0147249 | A1* | 6/2008 | Kuge et al. | 701/1 |

OTHER PUBLICATIONS

Integrated position estimation using aerial image sequences; Dong-Gyu Sim et al.; Pattern Analysis and Machine Intelligence, IEEE Transactions on; vol. 24, Issue 1, Jan. 2002 pp. 1-18; Digital Object Identifier 10.1109/34.982881.*

Inertial Navigation Aided by Monocular Camera Observations of Unknown Features; George, M. et al.; Robotics and Automation, 2007 IEEE International Conference on; Apr. 10-14, 2007 pp. 3558-3564; Digital Object Identifier 10.1109/ROBOT.2007.364023.*

Use the GPS/IMU New Technology for Photogrammetric Application; Dahai Guo et al.; Geoscience and Remote Sensing Symposium, 2006. IGARSS 2006. IEEE International Conference on; Jul. 31, 2006-Aug. 4, 2006 pp. 1107-1110 Digital Object Identifier 10.1109/IGARSS.2006.286.*

Tracking with omni-directional vision for outdoor AR systems; Jong Weon Lee et al.; Mixed and Augmented Reality, 2002. ISMAR 2002. Proceedings. International Symposium on; Sep. 30-Oct. 1, 2002 pp. 47-56; Digital Object Identifier 10.1109/ISMAR.2002.1115069.*

Going out: robust model-based tracking for outdoor augmented reality; Reitmayr, G. et al.; Mixed and Augmented Reality, 2006. ISMAR 2006. IEEE/ACM International Symposium on; Oct. 22-25, 2006 pp. 109-118; Digital Object Identifier 10.1109/ISMAR.2006.297801.*

An evaluation of the Tight Optical Integration (TO1) algorithm sensitivity to inertial and camera errors; Bhattacharya, S. et al.; Position, Location and Navigation Symposium, 2008 IEEE/ION; May 5-8, 2008 pp. 533-540; Digital Object Identifier 10.1109/PLANS.2008.4570061.*

Location-based Services using Image Search; Vertongen, P. et al.; Applications of Computer Vision, 2008. WACV 2008. IEEE Workshop on; Jan. 7-9, 2008 pp. 1-6; Digital Object Identifier 10.1109/WACV.2008.4544005.*

An Integrated UAV Navigation System Based on Aerial Image Matching; Conte, G. et al.; Aerospace Conference, 2008 IEEE Mar. 1-8, 2008 pp. 1-10; Digital Object Identifier 10.1109/AERO.2008.4526556.*

Ten-fold Improvement in Visual Odometry Using Landmark Matching; Zhiwei Zhu et al.; Computer Vision, 2007. ICCV 2007. IEEE 11th International Conference on; Oct. 14-21, 2007 pp. 1-8; Digital Object Identifier 10.1109/ICCV.2007.4409062.*

Localization in urban environments: monocular vision compared to a differential GPS sensor; Royer, E. et al.; Computer Vision and Pattern Recognition, 2005. CVPR 2005. IEEE Computer Society Conference on; vol. 2, Jun. 20-25, 2005 pp. 114-121 vol. 2; Digital Object Identifier 10.1109/CVPR.2005.217.*

V-GPS—image-based control for 3D guidance systems; Burschka, D. et al.; Intelligent Robots and Systems, 2003. (IROS 2003). Proceedings. 2003 IEEE/RSJ International Conference on; vol. 2, Oct. 27-31, 2003 pp. 1789-1795 vol. 2.*

Robust position estimation using images from an uncalibrated camera; Doehler, H.-U. et al.; Digital Avionics Systems Conference, 2003. DASC '03. The $22^{nd}$; vol. 2, Oct. 12-16, 2003 Page(s):9.D.2-9.1-7 vol. 2; Digital Object Identifier 10.1109/DASC.2003.1245917.*

Matching buildings: pose estimation in an urban environment; Coors, V. et al.; Augmented Reality, 2000. (ISAR 2000). Proceedings. IEEE and ACM International Symposium on; Oct. 5-6, 2000 pp. 89-92; Digital Object Identifier 10.1109/ISAR.2000.880928.*

Virtuous: vision-based road transportation for unmanned operation on urban-like scenarios; Sotelo, M.A. et al.; Intelligent Transportation Systems, IEEE Transactions on; vol. 5, Issue 2, Jun. 2004 pp. 69-83; Digital Object Identifier 10.1109/TITS.2004.828175.*

Vision-based guidance and control of a hovering vehicle in unknown, GPS-denied environments; Ahrens, S. et al.; Robotics and Automation, 2009. ICRA '09. IEEE International Conference on; May 12-17, 2009 pp. 2643-2648; Digital Object Identifier 10.1109/ROBOT.2009.5152680.*

Dynamic Background Segmentation for Remote Reference Image Updating within Motion Detection JPEG2000; Totozafiny, T.; Patrouix, O.; Luthon, F.; Coutellier, J.-M.; Industrial Electronics, 2006 IEEE International Symposium on; vol. 1 Digital Object Identifier: 10.1109/ISIE.2006.295647; Publication Year: 2006, pp. 505-510.*

Photomask Defect Extraction by Using Difference between a Reference Image and a Test Image after Illumination Adjustment Youngmin Ha; Intelligent Pervasive Computing, 2007. IPC. The 2007 International Conference on; Digital Object Identifier: 10.1109/IPC.2007.53; Publication Year: 2007, pp. 242-248.*

Robust Defect Detection System Using Double Reference Image Averaging for High Throughput SEM Inspection Tool Hiroi, T.; Okuda, H.; Advanced Semiconductor Manufacturing Conference, 2006. ASMC 2006. The 17th Annual SEMI/IEEE Digital Object Identifier: 10.1109/ASMC.2006.1638781; Publication Year: 2006, pp. 347-352.*

A reduced-reference perceptual quality metric for in-service image quality assessment; Kusuma, T.M.; Zepernick, H.-J.; Mobile Future and Symposium on Trends in Communications, 2003. SympoTIC '03. Joint First Workshop on; Digital Object Identifier: 10.1109/TIC.2003.1249092; Publication Year: 2003, pp. 71-74.*

An efficient medical image tracking algorithm based on motion estimation; Xiao-chun Zou; Ming-yi He; Xin-bo Zhao; Complex Medical Engineering, 2009. CME. ICME International Conference on; Digital Object Identifier: 10.1109/ICCME.2009.4906602; Publication Year: 2009, pp. 1-4.*

A visual servoing control law that is robust to image outliers; Comport, A.; Pressigout, M.; Marchand, E.; Chaumette, F.; Intelligent Robots and Systems, 2003. (IROS 2003). Proceedings. 2003 IEEE/RSJ International Conference on vol. 1; Digital Object Identifier: 10.1109/IROS.2003.1250677; Publication Year: 2003, pp. 492-497 vol. 1.*

A low-power analog correlation processor for real-time camera alignment and motion computation; McIlrath, L.G.; Circuits and Systems II: Analog and Digital Signal Processing, IEEE Transactions on; vol. 47, Issue: 12; Digital Object Identifier: 10.1109/82.899628; Publication Year: 2000, pp. 1353-1364.*

Minutiae location and direction adjustment for nonlinear distorted fingerprint image matching; Hui Chen; Jianping Yin; Xin Shu; Chunfeng Hu; Yong Li; Computer Engineering and Technology (ICCET), 2010 2nd International Conference on vol. 6; Digital Object Identifier: 10.1109/ICCET.2010.5486203; Publication Year: 2010, pp. V6-350-V6-35.*

Automated Geospatial Conflation of Vector Road Maps to High Resolution Imagery; Wenbo Song; Keller, J.M.; Haithcoat, T.L.; Davis, C.H.; Image Processing, IEEE Transactions on; vol. 18, Issue: 2; Digital Object Identifier: 10.1109/TIP.2008.2008044; Publication Year: 2009, pp. 388-400.*

Dynamic histogram warping of image pairs for constant image brightness; Cox, I.J.; Roy, S.; Hingorani, S.L.; Image Processing, 1995. Proceedings., International Conference on; vol. 2; Digital Object Identifier: 10.1109/ICIP.1995.537491 Publication Year: 1995, pp. 366-369 vol. 2.*

Transparent surface modeling from a pair of polarization images; Miyazaki, D.; Kagesawa, M.; Ikeuchi, K.; Pattern Analysis and Machine Intelligence, IEEE Transactions on; vol. 26, Issue: 1; Digital Object Identifier: 10.1109/TPAMI.2004.1261080 Publication Year: 2004, pp. 73-82.*

\* cited by examiner

DEVIATION-CORRECTION SYSTEM FOR POSITIONING OF MOVING OBJECTS AND MOTION TRACKING METHOD THEREOF

FIELD OF THE INVENTION

The present invention relates to a deviation-correction system for positioning of moving objects, and to a motion tracking method in the deviation-correction system for positioning of moving objects.

BACKGROUND OF THE INVENTION

The deviation-correction system is widely used in automated assembly and moving object positioning systems. For example, using a deviation-correction control system can ensure material meets the requirements of process or product quality during the procedures of channeling, reeling, transmission, splitting, concatenation and jointing. In addition, a deviation-correction system can be used to achieve the accurate vehicle positioning, etc. At present, the deviation-correction system is classified primarily into three types as follows:

1) A sensor deviation-correction control system is a system in which sensors detect the edge or line of roll goods, read deviation between an actual position and a preset position of the roll goods, convert the deviation into an electrical signal in proportional to it, and then input the signal to a controller, in which the signal is amplified and calibrated before it is transmitted to an actuator. Based on the magnitude of the signal, the actuator drives a guide bracket to replace the roll goods in the preset position. Various sensors, such as photoelectric sensor, ultrasonic sensor and line-type tracking sensor, are employed to meet the need for deviation correction from various roll goods, such as fully transparent roll goods, photosensitive film, steel plate roll goods and roll goods imprinted with contrast line for tracking. In this case, the deviation-correction accuracy can fall into a range of 0.5 mm or less.

2.) A laser deviation-correction control system is a system in which a laser beam is emitted along the designed axis of the conduit by a laser transmitter, and then is received by a laser receiver within a tool head. After the comparison between the laser beam and the actual center position of the tool head, the error signal is fed back to a computer for further processing. Then, a control apparatus adjusts the tool head based on the displacement error, thereby implementing the deviation-correction function.

3) A GPS based deviation-correction system is a GPS system employed by Shanghai Zhenhua Port Machinery Co. Ltd (ZPMC) for container crane and crossbeam-lifting Twin 40 ft quayside container crane so as to realize a error-correction positioning system with an error less than 15 mm.

In the above systems, the first one has a high accuracy, but a narrow applicability. The second and third ones are applicable to positioning of moving objects, while their cost is high.

SUMMARY OF THE INVENTION

An object of the present invention is to provide a deviation-correction system for positioning of moving objects with simple structure, low cost and high positioning accuracy. A further object of the present invention is to provide a motion tracking method in the deviation-correction system for positioning of moving objects.

According to an aspect of the invention, there is provided a deviation-correction system for positioning of moving objects comprising a control system for receiving motion parameters required for deviation-correction, and sending commands to an actuator to control a moving object based on the motion parameters, the deviation-correction system for positioning of moving objects further comprising: a reference object which is set as a specified motion trail for the moving object; an image capturing system for acquiring successive digital image data upon the moving object moves; a motion tracking system for performing a motion tracking algorithm based on the digital image data transmitted by the image capturing system to judge whether the current motion state needs to be corrected and then transmitting the motion parameters required for deviation-correction to the control system.

Preferably, the reference object is a static reference object on the ground.

Preferably, the static reference object on the ground includes a color-identified line or strip which is same as the motion trail.

Preferably, the reference object includes two fixed specific reference objects at the start point or the finish point of the moving object.

Preferably, the reference object comprises a static scene at the finishing point.

Preferably, the image capturing system comprises: one or more cameras; an illuminator or a light compensation device for compensating illumination to enhance the quality of images captured by the cameras.

Preferably, the motion tracking system comprises: a data acquisition card for acquiring image data; a computer for processing image data and transmitting the processed image data to the control system; and an interface to the control system for transmitting motion parameters.

According to another aspect of the invention, there is provided a motion-tracking method in the deviation-correction system for positioning of moving objects, the motion tracking method comprising: 1) receiving images transmitted from an image capturing system; 2) extracting feature of reference object image from two images, to obtain a matching feature pair; 3) computing the relative motion parameters of a moving object, based on the positional relation between the matching features in two images; 4) transmitting motion parameters to a controller for deviation-correction if the motion parameters under current motion state exceed preset threshold values, otherwise adding the motion parameters into the history record of motion trail.

Preferably, the step 2) comprises: positioning the reference objection in the images using an image processing method on the basis of the feature of the reference object.

Preferably, the image processing method determines the center axis of a straight line as matching feature if the straight line is taken as the reference object.

Preferably, the motion parameters include offset amount, direction and rotation.

Preferably, the preset threshold value is decided by the maximum deviation tolerable to the moving object.

Since the above configurations are employed, the present invention has a simpler structure and lower cost in terms of hardware, compared to the prior arts. In terms of software, an efficient algorithm is performed to track the motion trail of the moving object. Therefore the present invention is characterized by a high positioning accuracy.

Figure 1:
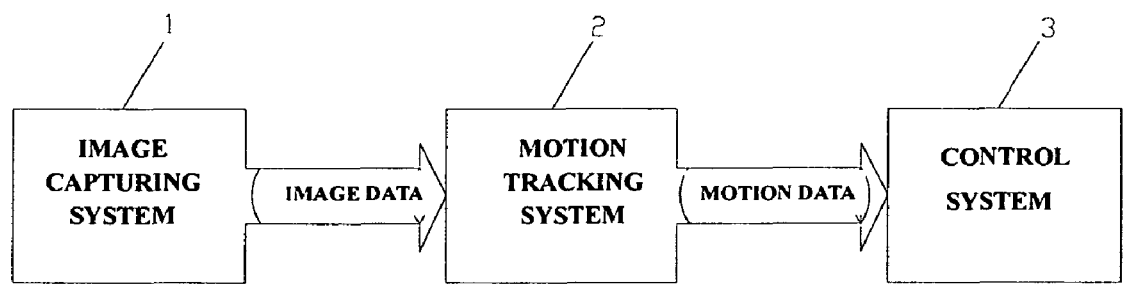
FIG. 1 is a schematic block diagram of the overall structure of a vehicle mounted deviation-correction system according to an embodiment of the present invention.

REFERENCE NUMERAL LIST 1 image capturing system
2 motion tracking system
3 SCM control system
4 moving object
5 camera
6 container to be inspected
7 reference object
8 illuminator
9 control box
10 data acquisition card
11 computer
12 preset motion direction

DETAILED DESCRIPTION OF THE PREFERRED EMBODIMENTS

The following preferred embodiments are described with an intention to illustrate the present invention, other than to limit the scope thereof.

FIG. 1 is a schematic block diagram of the overall structure of a vehicle mounted deviation-correction system according to an embodiment of the present invention. As shown in FIG. 1, the deviation-correction system for positioning of moving objects comprises an image capturing system 1, a motion tracking system 2 and a control system 3. The image capturing system 1 generates image data, and then sends it to the motion tracking system 2. The motion tracking system 2 generates motion parameters based on image data. The control system 3 controls a motion trail of a moving object 4 in accordance with the generated motion parameters.

Figure 2:
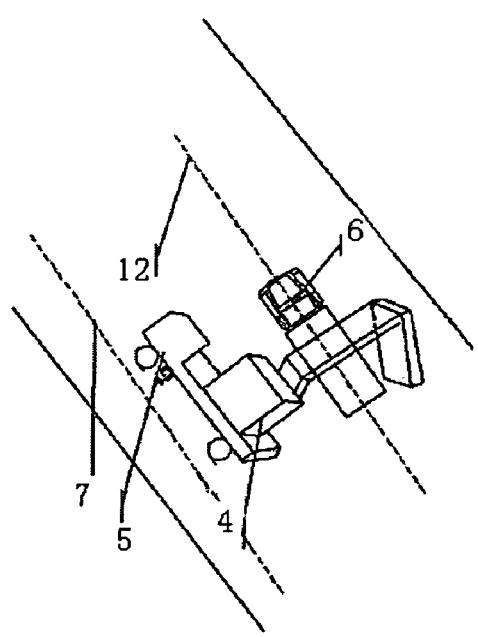
FIG. 2 is a schematic diagram showing operations of a vehicle mounted deviation-correction system according to an embodiment of the present invention.

FIG. 2 is a schematic diagram showing operations of a vehicle mounted deviation-correction system according to an embodiment of the present invention. As shown in FIG. 2, a reference object 7 is provided in the specified motion trail of the moving object 4. The reference object 7 can be a line or strip on ground surface, which is identified by color and is the same as the motion trail. The reference object 7 can also be two fixed reference objects at the start point or finish point of the moving object.

One or more cameras 5 are mounted on the moving object 4. Successive images, which contain the reference object, are captured by the camera 5, and sent to the motion tracking system 2. Then, the motion tracking system 2 tracks and measures the motion trail of the object 4 using a motion analysis algorithm. Based on the displacement and direction of the motion trail in each step, the judgment is made as to whether there is need for deviation correction, and the motion parameters such as deviation amount and deviation direction are outputted. Finally, the object position is adjusted by the control system 3 based on the amount and direction of the deviation, thereby implementing the deviation-correction for the object position.

Figure 3:
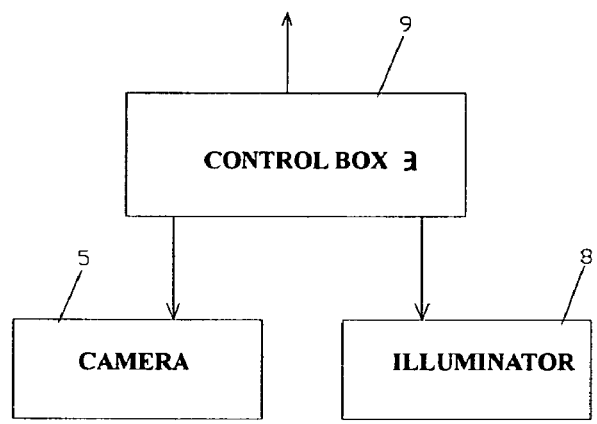
FIG. 3 is a schematic block diagram showing an image capturing system of the deviation-correction system according to an embodiment of the present invention.
Figure 4:
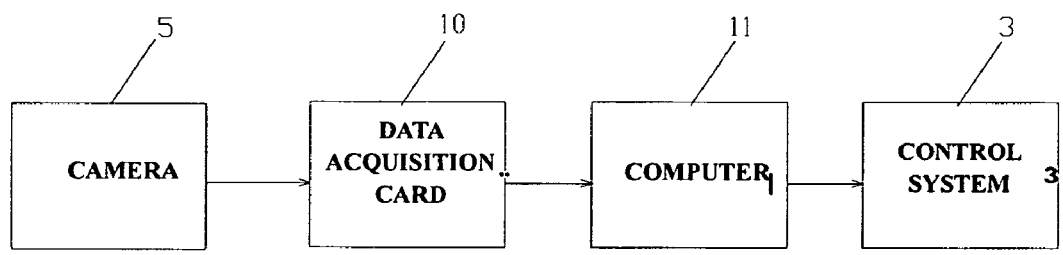
FIG. 4 is a schematic block diagram showing a motion tracking system according to an embodiment of the present invention.

As shown in FIG. 3 and FIG. 4, a data acquisition card 10 collects the images captured by the camera 5, as image data, and the image data is processed and transmitted to the control system 3 by the computer 11. During images capturing, the camera 5 is controlled by a control box 9 so as to be close to the ground as possible, which can ensure the captured images have a great number of details. In order to avoid the interference from external light source, the control box 9 controls an illuminator 8 or the light compensation apparatus, such as a high frequency dysprosium lamp, to reinforce the light source and to repel the external light source.

As described above, on the road along which the object 4 is moving, the colors between the reference object 7 and the background contrast to each other dramatically. The control system 3 is mounted on the moving object 4. The motion tracking system 2 computes the direction and distance of the deviation between the actual moving course and the preset motion trail through the motion analysis algorithm, and then transmits the information to the control system 3. The control system 3 controls the moving direction and distance of the object based on the obtained moving direction and distance of the object, thereby achieving the effect that the object's motion is congruous with the preset trail.

Moreover, the moving speed of the object 4 must be limited to a certain range, otherwise the camera 5 will miss some frames.

The operational steps of the motion-tracking method in the deviation-correction system for positioning of moving objects will be described as follows.

1) The motion tracking system 2 receives the image data transmitted from the image capturing system 1.

2) The matching feature pair is computed in the motion tracking system 2. The computer 11 searches for the reference objects 7 from two images for example two successive images, extracts the corresponding feature of them to obtain a matching feature pair, where a predetermined image processing method is used to search for the reference object 7 and the reference object 7 are localized based on its feature. For example, if a straight line is taken as the reference object 7, the image processing method can determine the center axis of the line as its matching feature.

3) The computer 11 computes the relative motion of actual objects to obtain motion parameters, which include motion offset amount, direction and rotation, etc., based on the position relation between the matching features in the two images.

4) If the offset amount and direction under the current motion state exceeds a preset threshold value, the motion parameters are transmitted to the control system 3 for deviation correction, otherwise the motion parameters are registered into the history record of motion trail.

For example, the threshold value is decided by the maximum deviation tolerable to the actual moving object.

Numerous modifications and variations of the present application are possible in light of the above teachings. It is therefore to be understood that within the scope of the appended claims, the application may be practiced otherwise than as specifically described herein.

What is claimed is:

1. A deviation-correction system for positioning of a moving object comprising a control system for receiving motion parameters required for deviation-correction, and sending commands to an actuator to control the moving object based on the motion parameters, the deviation-correction system for positioning of moving objects further comprising:

a reference object which represents a specified motion trail for the moving object;

an image capturing system mounted on the moving object for acquiring successive digital images upon movement of the moving object; and a motion tracking system for receiving images transmitted from the image capturing system, extracting a feature of a reference object from each of two successive images, to obtain a matching pair of the features of the reference object, computing motion parameters of the moving object based on the positional relationship between the features of the matching pair in the two successive images, and transmitting the motion parameters required for deviation-correction to the control system if the motion parameters exceed preset threshold values.

2. A motion-tracking method comprising:
1) receiving images transmitted from an image capturing system;
2) extracting a feature of a reference object image from each of two successive images, to obtain a matching pair of features of the reference object;
3) computing motion parameters of a moving object, based on the positional relationship between the features of the matching pair in the two successive images;
4) transmitting the motion parameters to a controller for deviation-correction if the motion parameters exceed preset threshold values, otherwise adding the motion parameters into a history record of motion trail.

3. The deviation-correction system for positioning of moving objects according to claim 1, wherein the reference object is a static reference object on the ground including a color-identified line or strip on the ground which is the same as the motion trail.

4. The motion tracking method according to claim 2, wherein the preset threshold value is decided by a maximum deviation tolerable to the moving object.

5. The motion tracking method according to claim 2, wherein the step 2) comprises:
positioning the reference object in the two successive images using an image processing method on the basis of the features of the matching pair.

6. The deviation-correction system for positioning of moving objects according to claim 1, wherein the image capturing system comprises:
one or more cameras;
an illuminator or a light compensation device for compensating illumination to enhance the quality of images captured by the cameras.

7. The deviation-correction system for positioning of moving objects according to claim 1, wherein the motion tracking system comprises:
a data acquisition card for acquiring image data;
a computer for processing image data and transmitting the processed image data to the control system; and
an interface to the control system for transmitting motion parameters.

8. The motion tracking method according to claim 5, wherein if a straight strip is taken as the reference object, a center axis of the straight strip is used as the features of the matching pair.

9. The motion tracking method according to claim 5, wherein computing the motion parameters of a moving object comprises computing offset amount, direction and rotation of the moving object.

* * * * *